US008751150B2

(12) United States Patent
Stählin

(10) Patent No.: US 8,751,150 B2
(45) Date of Patent: Jun. 10, 2014

(54) ONLINE GENERATION OF A DIGITAL MAP

(75) Inventor: Ulrich Stählin, Eschborn (DE)

(73) Assignee: Continental Teves AG & Co. OHG (DE)

( * ) Notice: Subject to any disclaimer, the term of this patent is extended or adjusted under 35 U.S.C. 154(b) by 349 days.

(21) Appl. No.: 12/673,871

(22) PCT Filed: Apr. 23, 2008

(86) PCT No.: PCT/EP2008/054944
§ 371 (c)(1),
(2), (4) Date: Feb. 17, 2010

(87) PCT Pub. No.: WO2009/030522
PCT Pub. Date: Mar. 12, 2009

(65) Prior Publication Data
US 2011/0071756 A1    Mar. 24, 2011

(30) Foreign Application Priority Data

Aug. 29, 2007  (DE) .......................... 10 2007 040 973
Mar. 5, 2008  (DE) .......................... 10 2008 012 654

(51) Int. Cl.
*G01C 21/00* (2006.01)

(52) U.S. Cl.
USPC ........... 701/409; 701/450; 701/532; 701/533; 340/511; 340/572.1

(58) Field of Classification Search
USPC ................ 701/432, 300, 533, 409, 450, 532; 340/511, 572.1
See application file for complete search history.

(56) References Cited

U.S. PATENT DOCUMENTS

| 6,266,598 | B1 * | 7/2001 | Pillar et al. ...................... 701/54 |
| 6,615,130 | B2 * | 9/2003 | Myr ............................. 701/117 |
| 7,881,862 | B2 * | 2/2011 | Pei et al. ....................... 701/432 |
| 2004/0024502 | A1 * | 2/2004 | Squires et al. .................. 701/33 |
| 2006/0217881 | A1 * | 9/2006 | Pei et al. ....................... 701/208 |
| 2007/0112503 | A1 * | 5/2007 | Johnson et al. ............... 701/117 |
| 2008/0162041 | A1 | 7/2008 | Nakamura |
| 2008/0262721 | A1 * | 10/2008 | Guo et al. ..................... 701/208 |
| 2010/0217523 | A1 * | 8/2010 | Neumann et al. ............ 701/208 |
| 2010/0284382 | A1 * | 11/2010 | Stahlin et al. ................. 370/338 |
| 2011/0022246 | A1 * | 1/2011 | Rieth et al. ....................... 701/1 |
| 2011/0066947 | A1 * | 3/2011 | Pei et al. ....................... 715/738 |
| 2011/0071756 | A1 * | 3/2011 | Stahlin ......................... 701/208 |
| 2011/0125401 | A1 * | 5/2011 | Stahlin ......................... 701/208 |

FOREIGN PATENT DOCUMENTS

| AU | 755096 | 12/2002 |
| DE | 197 42 414 A1 | 4/1999 |
| DE | 199 16 967 C1 | 11/2000 |
| DE | 100 30 932 A1 | 1/2002 |
| DE | 102 02 756 A1 | 8/2003 |
| DE | 102 58 470 A1 | 7/2004 |
| EP | 1 508 777 A1 | 2/2005 |
| EP | 1 939 589 A1 | 7/2008 |

\* cited by examiner

*Primary Examiner* — Thomas Black
*Assistant Examiner* — Wae Louie
(74) *Attorney, Agent, or Firm* — RatnerPrestia

(57) ABSTRACT

An update device for generating and updating a digital map in a vehicle is specified which resorts to position data from adjacent vehicles. The position data can be processed further within the update device in order to allow accurate and prompt updating of a subregion of the map without this requiring communication with the map manufacturer or service provider.

14 Claims, 2 Drawing Sheets

ONLINE GENERATION OF A DIGITAL MAP

CROSS REFERENCE TO RELATED APPLICATIONS

This application is the U.S. national phase of PCT International Application No. PCT/EP2008/054944, filed Apr. 23, 2008, which claims priority to German Patent Application No. 10 2007 040 973.9, filed Aug. 29, 2007 and German Patent Application No. 10 2008 012 654.3, filed Mar. 5, 2008, the contents of such applications being incorporated by reference herein.

FIELD OF THE INVENTION

The invention relates to navigation and safety engineering for vehicles. In particular, the invention relates to an update device for generating and updating a digital map, an update system, the use of an update device in a vehicle, a method for generating and updating a digital map for a vehicle, a computer program product and a computer-readable medium.

BACKGROUND OF THE INVENTION

The rapid increase in vehicle traffic on the roads and the associated queues and travel time extensions are resulting in increased efforts worldwide to identify traffic states and to take them into account for the route selection or for route calculation in navigation systems or driver assistance systems.

Many driver assistance systems can be significantly upgraded or improved through the addition of a digital map. However, digital maps are usually already outdated when they are delivered. It is therefore imperative for the map to be updated if the digital map is intended to be consistent with current circumstances. However, these updates comprise a large volume of data, since the whole map is always brought up to date.

In addition, the updates generally only depict a road situation which is already a considerable time in the past. The reason for this is, inter alia, that the volume of data to be processed is relatively large and it therefore sometimes takes a relatively long time before a corresponding update file is generated and transmitted to the vehicle system.

SUMMARY OF THE INVENTION

It is an object of the invention to provide improved generation and updating of a digital map.

The invention specifies an update device, an update system, the use of an update device in a vehicle, a method for generating and updating a digital map, a computer program product and a computer-readable medium.

The exemplary embodiments described relate in equal measure to the update device, the update system, the use, the method, the computer program product and the computer-readable medium.

In line with one exemplary embodiment of the invention, an update device for generating and updating a digital map for a first vehicle is specified which has a communication unit for receiving first update data and an update unit for generating or updating a local portion of the digital map on the basis of the update data, wherein the first update data are based on at least one measured value for a position of a second vehicle.

In other words, the digital map can be updated on the basis of measured values from other vehicles. It is also possible to generate, that is to say to set up afresh, a new digital map or a new subregion of a digital map on the basis of said measured values. By way of example, this may be necessary when the driver leaves the area of the previous digital map.

In this way, it is possible to improve all systems based on digital maps, particularly driver assistance systems, which are reliant on accurate map data, or else navigation systems. Similarly, it is also possible to improve navigation systems which resort to a digital navigation map.

The term "digital maps" is also intended to be understood to mean maps for advanced driver assistance systems (ADASs), without any navigation taking place.

By way of example, the vehicle is a motor vehicle, such as a car, bus or heavy goods vehicle, or else is a rail vehicle, a ship, an aircraft, such as a helicopter or airplane, or, by way of example, a bicycle.

The wireless transmission or the wireless reception of the update data is effected by GSM, UMTS, WLAN (e.g. 802.11p) or else by WiMax. The use of other transmission protocols is also possible. Said protocols afford the advantage of standardization already having taken place.

In line with a further exemplary embodiment of the invention, the second vehicle is situated in the surroundings of the first vehicle, so that the update data relate to a portion of the digital map which is located in the surroundings of the first vehicle.

By way of example, the second vehicle is a vehicle traveling in front of the first vehicle, or is an oncoming vehicle with respect to the first vehicle. In this way, it is possible to use transmission techniques which have only a relatively short range, for example vehicle-to-vehicle communication based on WLAN (802.11p). An effect which can be automatically achieved thereby is that only update data from adjacent vehicles are received. This allows the data traffic to be reduced, and only the region of the digital map in which the first vehicle is currently situated is ever updated.

In line with a further exemplary embodiment of the invention, the update device has an input device which the driver can use to determine which portion of the digital map currently needs to be updated.

By way of example, the driver can determine that only the portion of the digital map which the vehicle will probably reach within the next ten minutes, for example, or within the next hour is ever updated. The relevant threshold value can be set by the driver himself. As a result, it is possible to reduce the volume of data which is to be transmitted. The driver is also able to decide for himself whether he wishes to have a totally different map detail or even the entire digital map updated. By way of example, he can input a particular route into the system and determine that this route needs to be updated, possibly in combination with alternative routes. This may be of benefit before starting a vacation trip, for example.

It is thus not necessary to update the entire digital map; on the contrary, selected subregions of the map can be updated.

In line with a further exemplary embodiment of the invention, the update device additionally has a capture device for capturing a measured value for the current position of the first vehicle, wherein the communication unit is designed to transmit second update data, which are based on the captured measured value, to the second vehicle.

In other words, the update device is not only capable of updating selected subregions of the digital map. On the contrary, the update device is also used to allow such an update for the driver's own vehicle and for other vehicles in the first place, namely by virtue of the measured values which are useful for the update being captured and transmitted.

These measured values may be not only the current position of the vehicle but also further measured values, such as the current vehicle speed, the current outside temperature, or else may be interventions by an ABS system, a TCS system or an ESP system, for example, possibly in combination with the vehicle speed.

In this way, the update data may contain not only the normal road data but also further advice, such as hazard warnings against black ice or fog or warnings against queues.

In line with a further exemplary embodiment of the invention, the first update data are transmitted directly from the second vehicle or (indirectly) from the control center to the first vehicle.

The position data are thus transmitted by vehicle-to-vehicle communication or by vehicle-to-infrastructure communication.

Furthermore, the interposed control center may be designed to edit, select, filter or else simply store the update data or the measurement data.

In line with a further exemplary embodiment of the invention, the update device is also designed to statistically evaluate all received update data.

In this way, it is possible to reduce a negative influence of mismeasurements. In addition, inaccurate position measurements can be averaged out, which means that the accuracy of the digital map can be increased.

In line with a further exemplary embodiment of the invention, the update device also has a memory device for storing the update for the digital map.

In addition or alternatively, the storage can also be performed in the control center.

In line with a further exemplary embodiment of the invention, the update device also has a warning device for warning the driver of hazards. In this case, the hazards are identified on the basis of the update data.

The warning device may be an audible warning device or else a visual warning device, for example in the form of an indicator or a light.

In line with a further exemplary embodiment of the invention, the digital map is a digital navigation map. In addition, the digital map may also be a map for a driver assistance system.

In line with a further exemplary embodiment of the invention, an update system for generating and updating a digital map for a first vehicle is specified which has a first update device as described above in a first vehicle and a second update device as described above in a second vehicle. In addition, the update system has a control center for receiving update data from the first vehicle and for transmitting the update data to the second vehicle.

The update data can be sent from the control center to particular, selected vehicles which are situated in a relevant area (in a particular portion of the digital map), for example, are approaching the area or the driver's of which are planning to drive through the area. The control center may also be designed to send particular, selected update data to all users if they are important data which affect all the users, for example.

In line with a further exemplary embodiment of the invention, the use of an update device as described above in a vehicle is specified.

In line with a further exemplary embodiment of the invention, a method for generating and updating a digital map for a first vehicle is specified in which update data are received in the first vehicle and a local portion of the digital map is generated or updated on the basis of the update data. In this case, the update data are based on at least one measured value for a position of a second vehicle.

It is thus possible for a multiplicity of vehicles to measure their positions and to transmit appropriate update data to the first vehicle (directly or via the indirect route of the control center). The first vehicle can then evaluate all received data and then update or regenerate its digital map.

In line with a further exemplary embodiment of the invention, a computer program product is specified which, when executed on a processor, instructs the processor to perform the method steps described above.

In line with a further exemplary embodiment of the invention, a computer-readable medium is specified which stores a computer program product which, when executed on a processor, instructs the processor to perform the method steps described above.

A fundamental consideration of the invention can be seen in that a digital map in a vehicle is brought up to date locally around the current position of the vehicle without this involving communication with a map manufacturer or a service provider at a charge. Complete updates for the complete map are also not required and the editing time for a map manufacturer or service provider is dispensed with. The updating of the map is merely related to the current position of the vehicle and is as up to date as possible.

Preferred exemplary embodiments of the invention are described below with reference to the figures.

BRIEF DESCRIPTION OF THE DRAWINGS

The invention is best understood from the following detailed description when read in connection with the accompanying drawings. Included in the drawings is the following figures.

Figure 1:
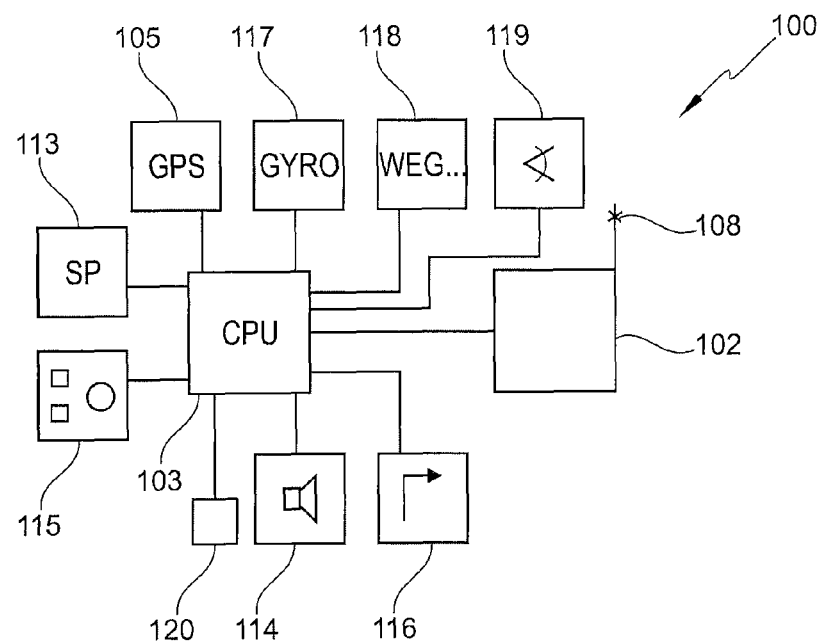
FIG. 1 shows a schematic illustration of an update device based on an exemplary embodiment of the invention.

The illustrations in the figures are schematic and not to scale.

DETAILED DESCRIPTION OF THE PREFERRED EMBODIMENTS

In the description of the figures which follows, the same reference numerals are used for the same or similar elements.

FIG. 1 shows a schematic illustration of components of an update device 100 for a vehicle based on an exemplary embodiment of the invention. By way of example, the update device 100 is installed in the vehicle and is used not only for updating a digital map but also for regenerating digital maps or map regions which were not stored to date.

The update device 100 has a communication unit 102 with an antenna 108. This communication unit 102 can be used by the update device to communicate with other vehicles and possibly with a server in a traffic control center. In addition, the update device 100 has an update unit 103 with a processor, said update unit controlling the device 100 and performing the update or regeneration for the digital map.

The update unit 103 is connected to an input unit 115. The input unit 115 can be used to make various adjustments on the device. By way of example, a destination and possibly also a location can be selected for a navigation unit. In this case, the destination can be input by inputting the full name of the destination or else by selecting from a list which is presented on a visual output unit, such as a monitor 116, for example.

The monitor 116 is also used to output the routing information. Furthermore, the routing information can also be output via an audible output unit 114. Said audible output unit 114 can also be used to output warnings. Output via the audible output unit 114 has the advantage that the driver is less distracted from what is currently happening in the traffic. A memory element 113, which is connected to the central computation unit or update unit 103 or is integrated in the update unit 103, stores the map data (digital map data) in the form of data records. By way of example, the memory element 113 also stores additional information about traffic restrictions and the like in association with the data records.

The update unit 103 may also be connected to a driver assistance system 120.

For the purpose of determining the current vehicle position, the update device 100 has a positioning unit 105 with a GPS receiver which is designed to receive position signals from GPS satellites. Naturally, the positioning unit (capture unit) 105 may also be designed for other satellite navigation systems, such as Galileo.

Since the GPS signals cannot always be received in city centers, for example, the device 100 also has a direction sensor 117, a distance sensor 118 and possibly also a steering wheel angle sensor 119 for the purpose of performing compound navigation. Signals from the GPS receiver, from the distance sensor, from the direction sensor and/or from the steering wheel angle sensor are handled in the processor 103, for example. The vehicle position ascertained from said signals is aligned with the road maps using map matching. The routing information obtained in this manner is finally output via the monitor 116.

Since the digital map data are outdated relatively quickly, a subregion of the digital maps is updated, in line with the invention, on the basis of current vehicle positions for adjacent vehicles.

Each vehicle transmits its own position using vehicle-to-vehicle communication or vehicle-to-infrastructure communication. Said position can be ascertained by GPS or Galileo, for example. Each vehicle receives the position of all the other vehicles within its range, possibly via the indirect route via the control center.

Since all the vehicles are moving, this makes it possible to identify where roads are situated, in a similar manner to a column of ants. In this context, what is meant is that the update device can ascertain the current route from the multiplicity of transmitted position data from the other vehicles. This can involve the use of statistical methods and filters in order to compensate for mismeasurements and to increase the accuracy of the result (even though it is entirely possible for every single position measurement to exhibit an inaccuracy of several meters). The update device is capable of calculating the route from the individual (edited) positions of the other vehicles, that is to say to attribute roads to appropriate individual positions.

This allows the generation of a totally new map portion.

The transmitted information can thus be used to check and possibly correct a digital map which is already present. Since particularly vehicles traveling in front and oncoming vehicles contribute to this information, these important portions of the map are most up to date. Inaccuracies as a result of GPS or Galileo are rectified and are relativized by means of alignment with the driver's own position. In particular, critical points, such as sharp bends, can be clearly identified despite these inaccuracies.

In addition, infrastructure-to-vehicle communication (that is to say communication between the control center and the individual vehicles) can be used to send the course of the road at a hazardous point to all the vehicles at said point and hence to ensure that all vehicles at said point can use an up-to-date digital map. Even for vehicles without a digital map, it is possible to use said information to better warn the driver or to provide him with the assistance of driver assistance systems.

The changes in the map are stored, so that they are available again when next traveling on the same route and do not need to be "learned" again.

Figure 2:
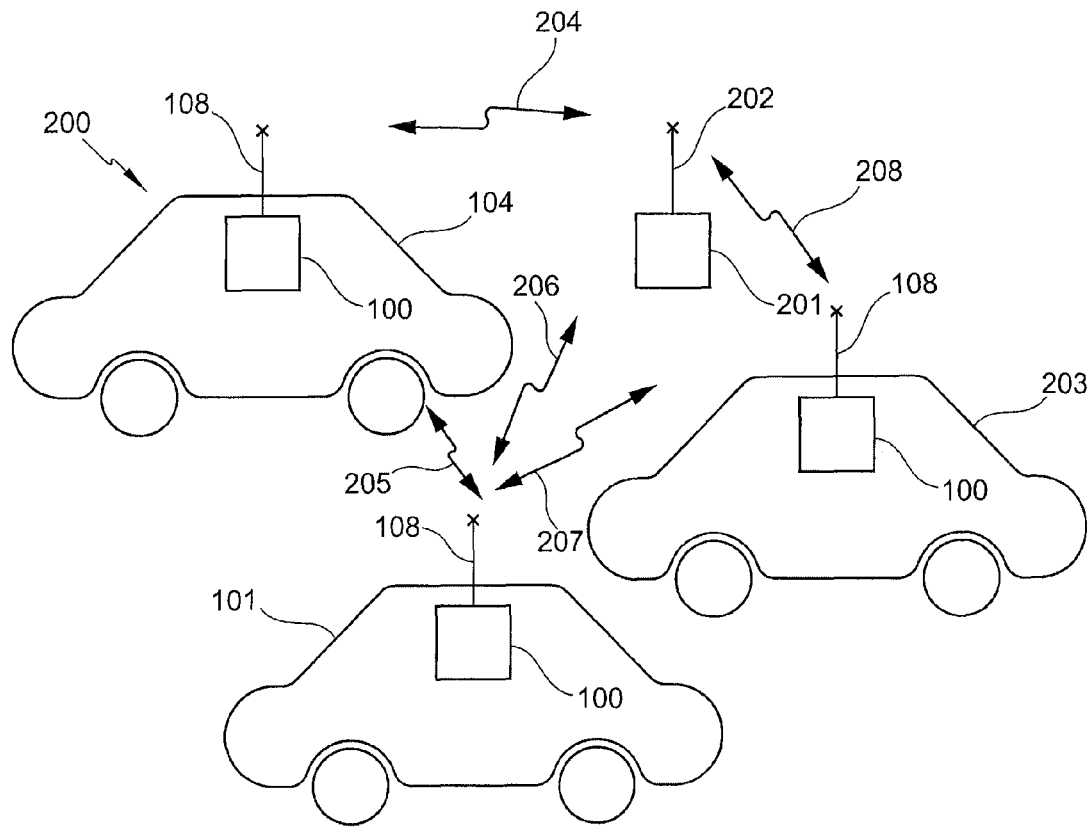
FIG. 2 shows a schematic illustration of an update system based on an exemplary embodiment of the invention.

FIG. 2 shows a schematic illustration of an update system 200 which has a multiplicity of vehicles 101, 104, 203 with appropriate update devices 100. All vehicles 101, 104, 203 are capable of communicating with one another, as symbolized by the arrows 205, 206, 207. In addition, all vehicles are capable of communicating with a control center which has a server 201 with an antenna 202, as symbolized by the arrows 204, 208.

Figure 3:
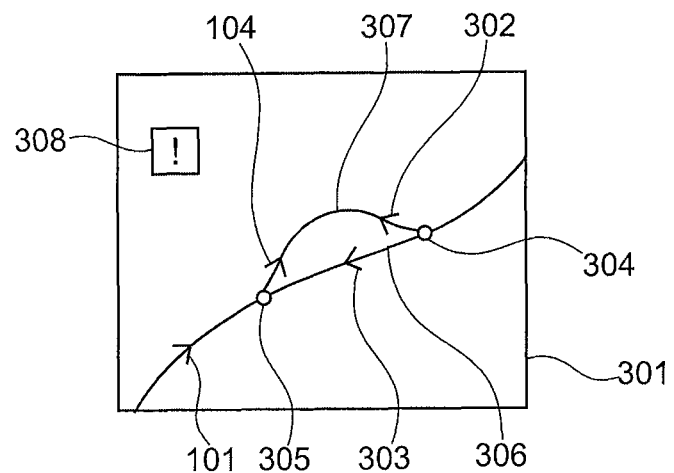
FIG. 3 shows a schematic illustration of a detail from a digital navigation map based on an exemplary embodiment of the invention.

FIG. 3 shows a schematic illustration of a subregion 301 of a digital map, in this case a digital navigation map. The vehicle 101 is situated on a road 306 and is approaching the junction 305. In this case, the vehicle 101 receives position data and other data, which have been measured by a traction controller, such as ABS (Antilock Braking System), TCS (Traction Control System), ESP (Electronic Stability Program, may also contain traction control system) or EDL (Electronic Differential Lock), for example, both from the oncoming vehicle 303 and from the further vehicles 104 and 302 which are situated on an alternative route 307.

After appropriate evaluation of the data, a warning 308 is automatically displayed and also audibly communicated to the driver. The warning 308 contains the information that there is a fallen tree on the route 306 between the exit 305 and the exit 304 (this information has been measured by the vehicle 303). On the basis of the position data from the vehicles 104 and 302, the update device knows that the hazard spot can be bypassed using the bypass 307, which leads to the place 304.

The bypass 307 was not known to the navigation system previously, since this is a new road.

Thus, if the driver's own vehicle is moving on a road which is not yet recorded in its map, the movement of the vehicle traveling in front and the oncoming vehicle reveals that there are also other possible roads, for example. By way of example, it is also possible to identify that a sharp bend is drawing near, for example, and the driver can be warned of the bend as appropriate, possibly audibly.

Highly up-to-date, location-specific updating of the digital map is thus possible.

Figure 4:
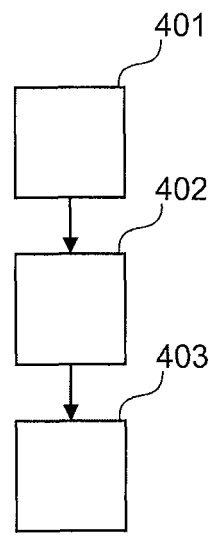
FIG. 4 shows a flowchart for a method based on an exemplary embodiment of the invention.

FIG. 4 shows a flow chart for a method based on an exemplary embodiment of the invention. In step 401, position data and other measurement data are collected from vehicles in the surroundings. These data have been transmitted to the vehicle by vehicle-to-vehicle communication and/or vehicle-to-infrastructure communication.

In step 402, the available map is locally updated by said transmitted position data from the vehicles in the surroundings, possibly with simultaneous regard to other data, such as warning data relating to a hazard spot.

In step 403, the changes in the map are stored either in the map itself or on a separate storage medium. In this case, the data from the digital map do not need to be changed, in order to reduce the risk of damaging the map through incorrect storage.

The communication between the control center and the vehicles and between the individual vehicles can be effected with appropriate encryption in order to ensure data integrity and to prevent misuse.

In addition, it should be pointed out that "comprising" and "having" do not exclude other elements or steps, and "a" or "an" does not exclude a large number. Furthermore, it should be pointed out that features or steps which have been described with reference to one of the above exemplary embodiments can also be used in combination with other features or steps from other exemplary embodiments described above.

The invention claimed is:

1. An update device of a first vehicle for generating and updating a digital map for the first vehicle, said update device of the first vehicle comprising:
    a communication unit for receiving update data from a second vehicle, the update data including position information of the second vehicle and roadway information detected by a driving dynamic system of the second vehicle; and
    an update unit for generating or updating the roadway for the first vehicle on a basis of the update data,
    wherein the driving dynamic system includes at least one of an anti-lock brake system (ABS), a Traction Control System (TCS), an Electronic Stability Program (ESP) and an Electronic Differential Lock (EDL).

2. The update device as claimed in claim 1,
    wherein the second vehicle is situated in surroundings of the first vehicle, so that the update data relate to a portion of the digital map which is located in the surroundings of the first vehicle.

3. The update device as claimed in claim 1,
    wherein the update device has an input device which a driver can use to determine which portion of the digital map needs to be updated.

4. The update device as claimed in claim 1 further comprising:
    a capture unit for capturing a measured value for a position of the first vehicle;
    wherein the communication unit is configured to transmit second update data, which is based on captured measured value, to the second vehicle.

5. The update device as claimed in claim 1, wherein the first update data are transmitted directly from the second vehicle or from a control center to the first vehicle.

6. The update device as claimed in claim 1,
    wherein the update device is configured to statistically evaluate all received update data.

7. The update device as claimed in claim 1 further comprising:
    a memory device for storing an update for the digital map.

8. The update device as claimed in claim 1 further comprising:
    a warning device to warn a driver of hazards which have been identified on a basis of the update data.

9. The update device as claimed in claim 1,
    wherein the digital map is a digital navigation map.

10. An update system for generating and updating a digital map for a first vehicle, said update system comprising:
    a first and second update device as claimed in claim 1 in a first vehicle; and
    a control center for receiving update data from the first vehicle and for transmitting the update data to the second vehicle.

11. The use of an update device as claimed in claim 1 in a vehicle.

12. A method for generating and updating a digital map for a first vehicle, said method comprising the following steps:
    receiving update data in the first vehicle from a second vehicle, the update data including position information of the second vehicle and roadway information detected by a driving dynamic system of the second vehicle; and
    generating or updating the roadway for the first vehicle on a basis of the update data,
    wherein the driving dynamic system includes at least one of an anti-lock brake system (ABS), a Traction Control System (TCS), an Electronic Stability Program (ESP) and an Electronic Differential Lock (EDL).

13. A computer program product which, when executed on a processor, instructs the processor to perform the following steps:
    receive update data in a first vehicle from a second vehicle, the update data including position information of the second vehicle and roadway information detected by a driving dynamic system of the second vehicle; and
    generate or update the roadway for the first vehicle on a basis of the update data,
    wherein the driving dynamic system includes at least one of an anti-lock brake system (ABS), a Traction Control System (TCS), an Electronic Stability Program (ESP) and an Electronic Differential Lock (EDL).

14. A non-transitory computer-readable medium which stores a computer program product which, when executed on a processor, instructs the processor to perform the following steps:
    receive update data in a first vehicle from a second vehicle, the update data including position information of the second vehicle and roadway information detected by a driving dynamic system of the second vehicle; and
    generate or update the roadway for the first vehicle on a basis of the update data,
    wherein the driving dynamic system includes at least one of an anti-lock brake system (ABS), a Traction Control System (TCS), an Electronic Stability Program (ESP) and an Electronic Differential Lock (EDL).

* * * * *